May 31, 1960     A. E. PALERMO     2,938,681
FLYING MOTOR SCOOTER
Filed June 14, 1956     3 Sheets-Sheet 1

Antonio E. Palermo
INVENTOR.

BY *Clarence A. O'Brien*
*and Harvey B. Jackson*
Attorneys

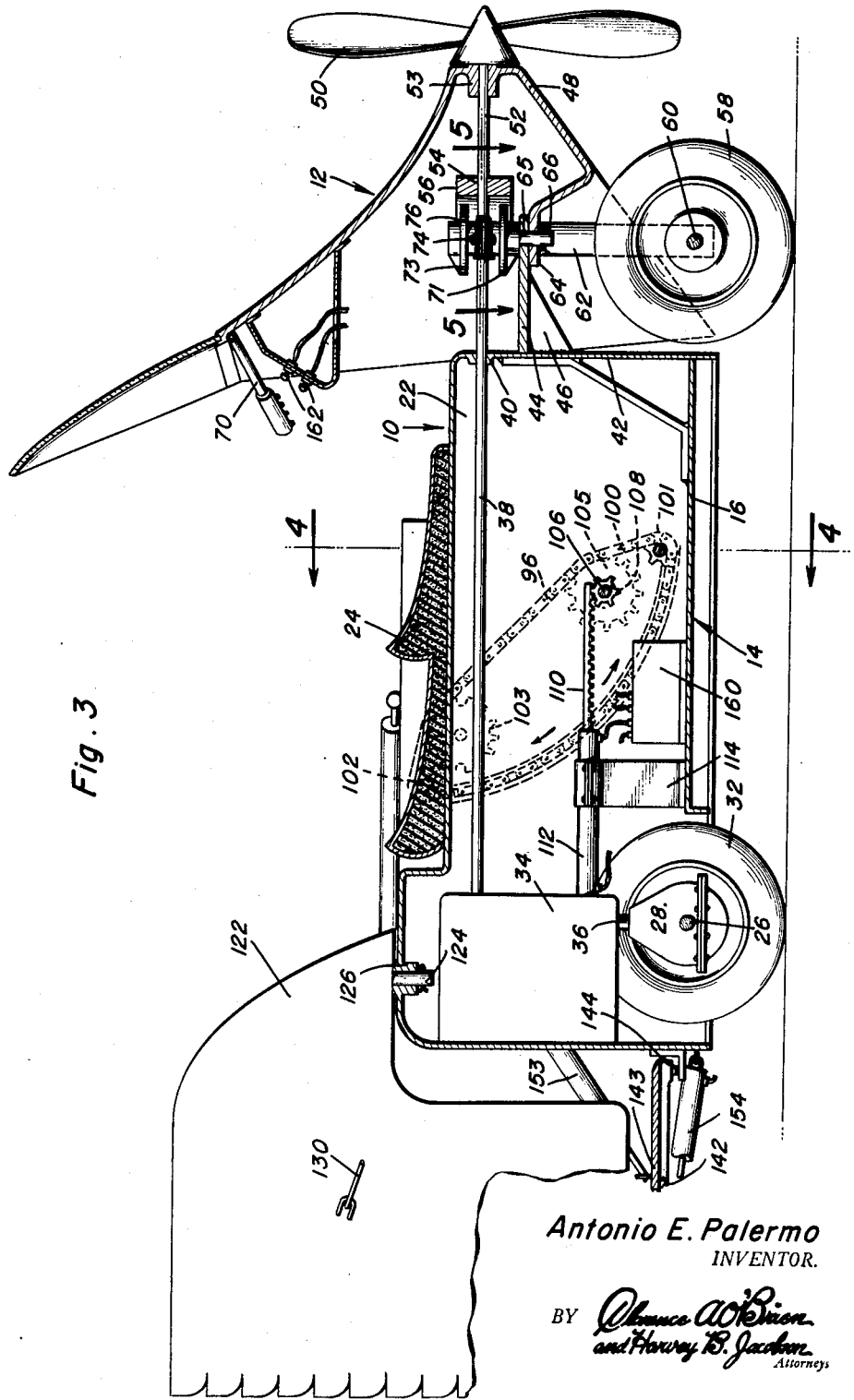

May 31, 1960     A. E. PALERMO     2,938,681
FLYING MOTOR SCOOTER
Filed June 14, 1956     3 Sheets-Sheet 3
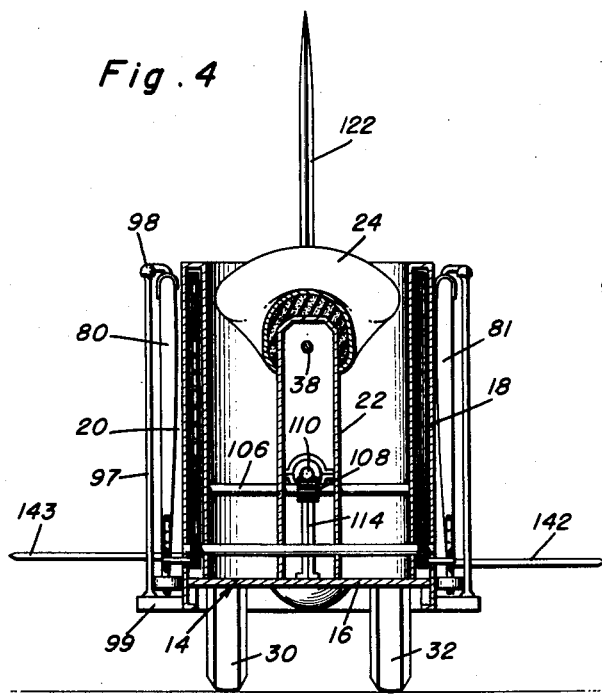
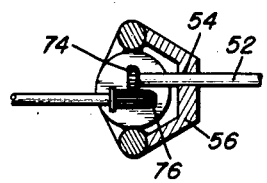
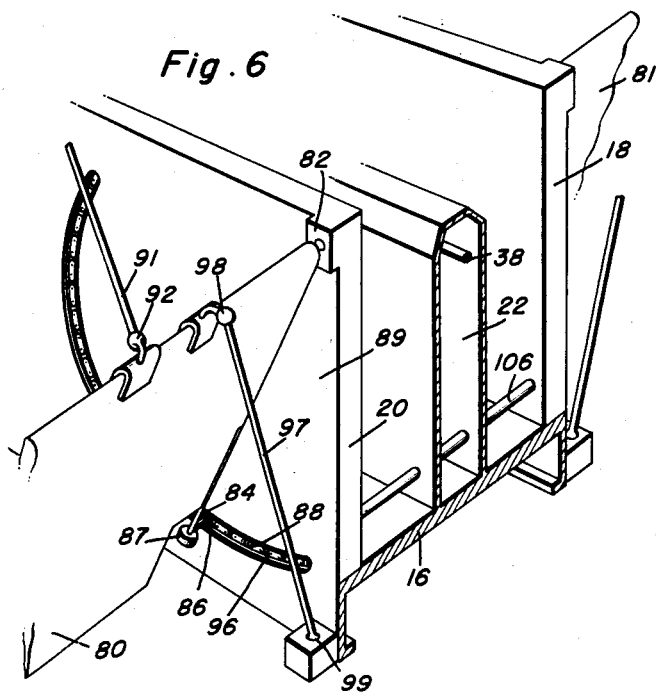
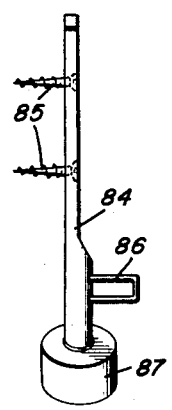
Antonio E. Palermo
INVENTOR.

United States Patent Office 2,938,681
Patented May 31, 1960

2,938,681
FLYING MOTOR SCOOTER

Antonio E. Palermo, 57 Preston St., Ottawa, Ontario, Canada

Filed June 14, 1956, Ser. No. 591,452

3 Claims. (Cl. 244—49)

This invention relates to motor vehicles and particularly to a vehicle that is convertible for air and land travel.

An object of the present invention is to provide a vehicle that is convertible from air to land use and from land to air use, the vehicle being of practical and simple construction. In the past, there have been proposals to make and there have been actual, successful flights of land vehicles. However, they have been quite cumbersome and complicated there having been usually provision for demountable wings and other parts deemed essential for flight, when the vehicle is used on the ground for road travel.

Accordingly, a further object of the present invention is to provide a three-wheeled motor scooter-type of vehicle where the wings are foldable to a position alongside of the body of the vehicle, the elevator is retractable and all of the other parts of the vehicle being commonly usable for both air and land travel.

A more specific object of the invention is to provide improved means for retracting the wings, these means being simplified and yet very positive in their operation and yet fully safe necessitating no manual adjustment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a longitudinal sectional view of the vehicle in Figure 1;

Figure 4 is a transverse sectional view taken on the line 4—4 of Figure 3;

Figure 5 is a sectional view taken on the line 5—5 of Figure 3;

Figure 6 is a fragmentary perspective view of a part of the rear section of the articulated body that is a part of the vehicle of Figure 3;

Figure 7 is a perspective view of a detail of the wing construction which is partially hidden in the remaining views.

Figure 1:
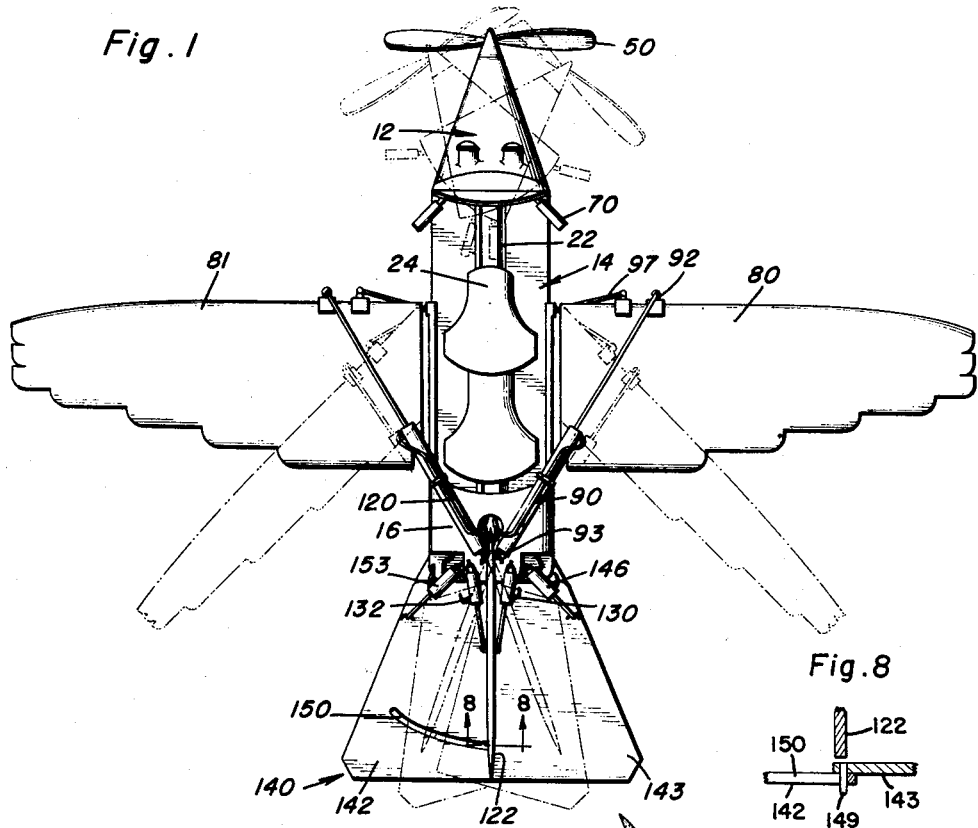
Figure 1 is a plan view of a convertible air and land vehicle that has been made in accordance with the invention.
Figure 8:
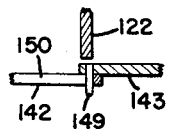
Figure 8 is an enlarged fragmentary sectional view taken substantially along the plane 8—8 of Figure 1.

In practicing the invention, there is an articulated body 10 made of lightweight material and having a front section 12 together with a rear section 14. The rear section is made of a housing that has a floor 16 whose lateral edges support vertically rising casings 18 and 20 (Fig. 4) made of a pair of spaced walls joined at the top. Vertical casing 22 also rises from floor 16 and is located between casings 18 and 20. A double saddle 24 is located on the top of casing 22. Rear axle 26 is mounted in bearings (not shown) carried by a part of the rear section 14 and has a differential 28 intermediate the ends thereof together with wheels 30 and 32 operatively connected to the axle. An engine 34 schematically represented in Figure 3, is carried by the rear section 14 of the vehicle body and has a drive shaft 36 operatively connected to the differential 28 in order to provide power for the rear wheels 30 and 32. Another drive shaft 38 extends from the engine and passes through a bearing 40 in the front wall 42 of casing 22, the legs of the operator and his passenger being protected from the rotating drive shaft 38 inasmuch as the drive shaft is located in casing 22. A forwardly extending bracket 44 is fixed to front wall 42 and is strengthened by gusset 46. Drive shaft 38 proceeds to a point in advance of front wall 42.

Front section 12 of the motor vehicle is tapered forwardly to a nose 48 at which there is a fixed pitch propeller 50 on a propeller shaft 52, the latter being mounted for rotation in bearings 53 and 54. Bearing 53 is secured at the front end of nose 48, while bearing 54 is formed in a yoke 56 constituting a part of a spindle assembly for the front wheel 58 of the motor vehicle. The front wheel is mounted for rotation on a short axle 60 that is carried at the lower end of the sides of fork 62. Key 64 integrally connected with the lower part of the front section 12 is disposed between the sides of fork 62 and it has an aperture in it. This aperture is in registry with aperture 65 formed in bracket 44 so that both of the apertures accommodate a spindle 66. As the front section 12 is turned to the left or the right by using the handlebars 70, key 64 causes fork 62 to revolve with it about the longitudinal axis of spindle 66. This steering motion of fork 62 is imparted to the lower disk 71 which is welded to the sides of the fork 62. In addition, yoke 56 is welded to these sides, and the upper disk 73 is also welded to yoke 56. The rear end of propeller shaft 52 has a gear 74 with teeth on it that are longitudinally curved. The front end of drive shaft 38 has a gear 76 on it, this gear being specially constructed so that the end thereof resembles a sphere. Gear 76 is rotated at the axis of oscillation of fork 62 so that when front section 12 is turned, gear 74 is capable of riding forwardly or rearwardly of gear 76, the curvature of the teeth in gear 74 making this possible. In the extreme positions of steering movement of section 12, only a part of the teeth of gear 74 will be enmeshed with the teeth 76, however, there will at all times be a driving connection established between these gears.

The vehicle is fitted with two wings 80 and 81, respectively. Each wing is identical in both construction and function, one being on the left and the other being on the right side of the articulated body. Considering first wing 80, it is constructed with a front spar to the end of which there is a ball and socket swivel connection 82, the location being at the root of the leading edge of wing 80. The root rib of the wing is formed by bar 84 which is connected to a backing rib, the connection being schematically represented by the screws 85 of Figure 7. A bracket 86 is fixed to the shank of bar 84 while the extremity of this bar is fitted with a roller 87 that functions as a guide for the wing as it is rotated about the swivel connection 82. The roller 87 is adapted to ride on the outer surface of section 14 while bracket 86 passes through slot 88 in wall 89 of casing 20.

There are a number of hydraulic motors used in the makeup of the adjustable parts of the convertible air and land vehicle. Each hydraulic motor is preferably a cylinder provided with a piston and a piston rod together with means to apply liquid under pressure into the cylinder. Motor 90 has its piston rod 91 connected to the leading edge of wing 80 by means of a ball and socket connector 92, the location being close to but spaced from the root of the wing 80. The opposite end of the fluid motor 90 is secured to the rear section 14 by being mounted swivelly on ring 93 carried by the top of rear section 12. As the hydraulic motor 90 pulls the wing 80 rearwardly from the extended position shown in Figure 1, the trailing edge at the root of the wing is moved downwardly by endless flexible member 96 disposed in case 20 and to which bracket 86 is secured. At the same time, the motion of the wing 80 is constrained by means of link 97 which is swivelly connected by a ball and socket 98 to the leading edge of wing 80 and swivelly connected to the lower part of the section 14 by a ball and socket 99.

Endless flexible member 96 comprises a chain 100 entrained around three idler gears 101, 102 and 103 that are mounted for rotation on spindles, together with sprocket 105 fixed to shaft 106. This shaft extends transversely across the two cases 18 and 20 and has a pinion 108 secured to and intermediate its ends. Rack 110 is in mesh with pinion 108 and is used for oscillating the pinion. The rack is fitted on the piston rod of a hydraulic cylinder 112 which is mounted on suitable brackets 114 in section 14. As the hydraulic motor 112 is actuated in one direction, a corresponding rotation of shaft 106 results due to the engagement of the rack and pinion. This causes a corresponding movement of the chain 100, which movement results in swinging the root part of the trailing edge of wing 80.

Accordingly, motor 90 and motor 112 are adapted to be actuated simultaneously whereby the wing is simultaneously swung rearwardly and the trailing edge downwardly in order to move the wing from the position shown in Figure 1 in full lines to the position shown in dotted line and finally, to the fully retracted position shown in Figure 4. Link 97 functions as a guide to constrain the motion of the wing as does roller 87.

It is apparent from inspection of Figure 4 that all of the structure for actuating wing 80 is duplicated for the wing 81 and the common shaft 106 actuates the chain which corresponds to chain 100 simultaneously with the actuation of chain 100. Therefore, since hydraulic motor 120, corresponding to hydraulic motor 90, is adapted to be actuated simultaneously with hydraulic motor 90, both wings 80 and 81 are extended or retracted simultaneously.

The control surfaces at the rear of the convertible land and aircraft are quite simplified in construction. The rudder 122 is mounted for rotation on a spindle 124, the latter being in bearing 126 that is formed in the top of the rear section 14 of the articulated body. Hydraulic motors 130 and 132 are pivoted at their inner ends to the upper part of the vehicle body and at the rear thereof. They are also pivotally connected to structural parts of the rudder 122 in order to hydraulically actuate the rudder.

Figure 2:
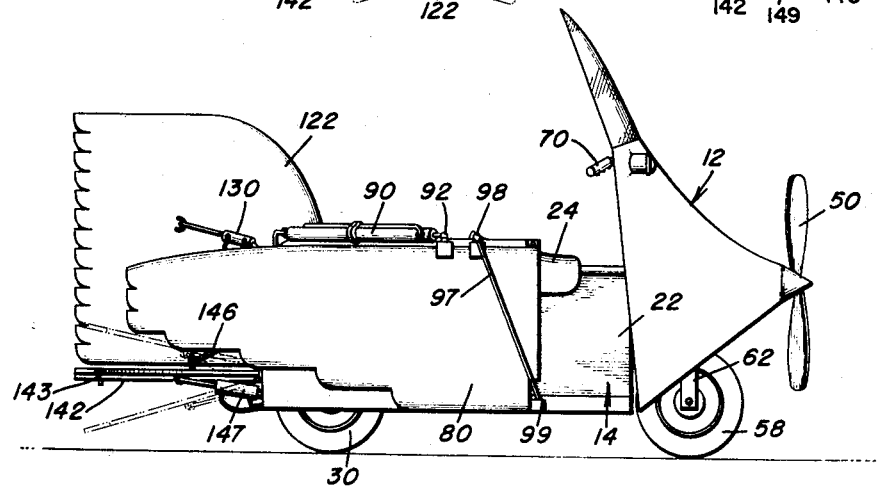
Figure 2 is an elevational view of the vehicle in Figure 1.

The elevator 140 consists of two panels 142 and 143, respectively, each panel being swivelly attached to the rear part of the body section 14, as by a ball and socket 144 (Fig. 3) for each. The panel 143 has an upper hydraulic cylinder 146 and a lower hydraulic cylinder 147 connected thereto. Both of these cylinders are pivoted at their ends respectively to the panel 143 with a pivot connection of the lower cylinder permitting vertical movement (Fig. 2) of panel 143 while upper cylinder 146 is arranged at an angle (Fig. 1) to move the panel 143 inwardly or outwardly in respect to the longitudinal axis of the vehicle. This is for the purpose of retracting the elevator to an inoperative position when the vehicle is used on land and for extending the elevator when the same is used for aerodynamic purposes. There is a pin 149 that proceeds from the bottom surface of panel 143 and fits in slot 150 formed in panel 142. The pin and slot constrain the relative motion of panels 142 and 143 to that which is proper. An identical motor arrangement, including upper hydraulic motor 153 and lower hydraulic motor 154 for the opposite panel 142 are connected therewith.

The controls for the motor, lighting and other details are standard parts and are not illustrated or described in any detail herein. The same holds true for the valve mechanisms that are used for the various hydraulic motors. The valve box 160 in section 14 is used to schematically represent a valve mechanism which may include a number of valves in order to provide hydraulic control for the various parts of the land and air vehicle. It is considered that the valve mechanism per se is separate and apart from the vehicle and is not detailed herein. Valve controls 162 in Figure 3 schematically represent means to operate the valves and other parts of the unshown hydraulic controls.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. In a vehicle that is convertible for both air and land use, a vehicle body, a left and a right wing that have a leading and a trailing edge, a swivel connection between said body and the leading edges of said wings at the root of each wing, each wing having means to move it to an extended and a retracted position, said means comprising for each wing an extensible member secured to said wing near the leading thereof and to said body, and means to swing said wing about its swivel connection by lifting or lowering the trailing edge, said last-named means including a flexible endless member which cooperates with a projection on said trailing edge, and a motion constraining link pivotally connected to said wing and said body, an elevator, a universal joint connecting said elevator to said body at the aft end of said body, and actuating means mounted between said elevator and said body for moving said elevator about said universal joint whereby it may be retracted to an inoperative position when the vehicle is converted to land use.

2. In a vehicle that is convertible for both air and land use, a vehicle body, a left and a right wing that have a leading and a trailing edge, a swivel connection between said body and the leading edges of said wings at the root of each wing, each wing having means to move it to an extended and a retracted position, said means comprising for each wing an extensible member secured to said wing near the leading edge thereof and to said body, and means secured to said trailing edge and to said body to swing said wing about its swivel connection, said swinging means including an endless member within said body, means in said body to move said endless member whereby said trailing edge is lifted or lowered pivoting said wing about its swivel connection and means secured to said leading edge and to said body to constrain the movement of said wing.

3. The combination of claim 2 wherein said endless member is a sprocket chain and said means in said body to move said chain comprises a rack, a hydraulic motor to reciprocally move said rack, pinion means in mesh with said rack, and means connecting said pinion means to said sprocket chain for moving said chain in response to movement of said rack.

References Cited in the file of this patent

UNITED STATES PATENTS

| 1,762,657 | Francesconi et al. | June 10, 1930 |
| 1,872,170 | Palmer | Aug. 16, 1932 |
| 1,958,486 | Medvedeff | May 15, 1934 |
| 2,692,095 | Carpenter | Oct. 19, 1954 |

FOREIGN PATENTS

| 438,355 | France | May 15, 1912 |